(12) United States Patent
Liao et al.

(10) Patent No.: US 10,670,950 B2
(45) Date of Patent: Jun. 2, 2020

(54) TRANSPARENT ROTATING DEVICE AND PROJECTION DEVICE

(71) Applicant: Coretronic Corporation, Hsin-Chu (TW)

(72) Inventors: Pei-Cheng Liao, HsinChu (TW); Kuang-Hsiang Chang, HsinChu (TW); Heng Li, HsinChu (TW); Yun-Sheng Wang, HsinChu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/537,636

(22) Filed: Aug. 12, 2019

(65) Prior Publication Data
US 2020/0050090 A1  Feb. 13, 2020

(30) Foreign Application Priority Data
Aug. 13, 2018 (CN) .................... 2018 2 1295565 U

(51) Int. Cl.
*G03B 21/14* (2006.01)
*H04N 9/31* (2006.01)
*G02B 26/08* (2006.01)

(52) U.S. Cl.
CPC ....... *G03B 21/145* (2013.01); *G02B 26/0875* (2013.01)

(58) Field of Classification Search
CPC .... G03B 21/14; G03B 21/142; G03B 21/145; G02B 26/0875

USPC ...................................... 359/209.1
See application file for complete search history.

(56) References Cited

U.S. PATENT DOCUMENTS 4,556,278 A * 12/1985 Schell .................. G02B 26/10
                                                        250/236
2019/0166340 A1 * 5/2019 Chang .................. G02B 7/1805

FOREIGN PATENT DOCUMENTS

TW       586312    5/2004
TW       M554179   1/2018
TW       M558853   4/2018

* cited by examiner

*Primary Examiner* — William C. Dowling
(74) *Attorney, Agent, or Firm* — JCIPRNET

(57) ABSTRACT

A transparent rotating device comprising a shaft, a transparent rotating assembly and a motor is provided. The transparent rotating assembly includes at least one first transparent sheet and at least one second transparent sheet that are annularly and alternatively arranged around a shaft. A motor is connected to the shaft, wherein the first transparent sheet and the second transparent sheet sequentially enter the transmission path of the image beam. The angle at which the first transparent sheet is inclined with respect to the shaft is different from the angle at which the second transparent sheet is inclined with respect to the shaft. The image beam penetrates the first transparent sheet to be deflected and transmitted to a first position, and the image beam penetrates the second transparent sheet to be deflected and transmitted to a second position.

20 Claims, 4 Drawing Sheets

TRANSPARENT ROTATING DEVICE AND PROJECTION DEVICE

CROSS-REFERENCE TO RELATED APPLICATION

This application claims the priority benefit of China application serial no. 201821295565.7, filed on Aug. 13, 2018. The entirety of the above-mentioned patent application is hereby incorporated by reference herein and made a part of this specification.

BACKGROUND

Technical Field

The disclosure relates to a transparent device and an optical device, and particularly relates to a transparent rotating device and a projection device.

Description of Related Art

A projection device is a display device adapted to generate a large-sized image. According to the imaging principle of the projector, an illuminating beam generated by a light source is converted into an image beam via a light valve, and the image beam is then projected onto a screen or a wall by means of a projection lens.

However, the resolution of the image converted by the light valve in existent products has gradually failed to meet the market demand. In order to further improve the image resolution, a high-resolution light valve may be used in the projection device, but the cost of this kind of projection device is expensive. In addition, in some projection devices, a resolution enhancement element adopting optical vibrating technology may be additionally disposed to further enhance the resolution of the image converted by the light valve. However, since light transmits through the resolution enhancement element, loss of light energy occurs as a result. At the same time, when the resolution enhancement element is used, it is required to use an elastic sheet element. Nevertheless, the use of the elastic sheet element tends to cause image discontinuity or distortion due to the issue of elastic fatigue. Besides, the current deflection angle and position of the resolution enhancement element when vibrating cannot be immediately known in use.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides a transparent rotating device and a projection device with the transparent rotating device. The projection device has simple structures and enhances image resolution.

Other objectives and advantages of the disclosure may be further understood by referring to the technical features broadly embodied and described as follows.

In view of one, a part of, or all of the aforementioned or other objectives, an embodiment of the disclosure provides a transparent rotating device including a shaft, a transparent rotating assembly and a motor. The transparent rotating assembly is disposed on the transmission path of an image beam and is connected to the shaft. The transparent rotating assembly includes at least one first transparent sheet and at least one second transparent sheet that are annularly and alternatively arranged around the shaft. The motor is connected to the shaft and is adapted for driving the shaft to rotate the transparent rotating assembly. Herein the at least one first transparent sheet and the at least one second transparent sheet sequentially enter the transmission path of the image beam. The angle at which the at least one first transparent sheet is inclined with respect to the shaft is different from the angle at which the at least one second transparent sheet is inclined with respect to the shaft. The image beam penetrates the at least one first transparent sheet to be deflected and transmitted to a first position, and the image beam penetrates the at least one second transparent sheet to be deflected and transmitted to a second position.

In view of one, a part of, or all of the aforementioned or other objectives, another embodiment of the disclosure provides a projection device that includes an illumination system, at least one light valve, a projection lens and a transparent rotating device. The illumination system is adapted to provide an illumination beam. The at least one light valve is disposed on the transmission path of the illumination beam for converting the illumination beam into an image beam. The projection lens has an incident end and is disposed on the transmission path of the image beam.

Based on the foregoing, the embodiments of the disclosure achieve at least one of the following advantages or effects. In one embodiment of the disclosure, when the motor drives the shaft, the transparent rotating assembly is driven by the shaft to be rotated, and the image beam is deflected to at least two different positions on the incident end of the projection lens by the plurality of transparent sheets that are continuously rotated. Therefore, as the position of the image as projected by the projection lens is changed at a high speed, a visual illusion is generated for human eyes due to the microscopic movement of the image, so that the user may attain an image with higher resolution.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
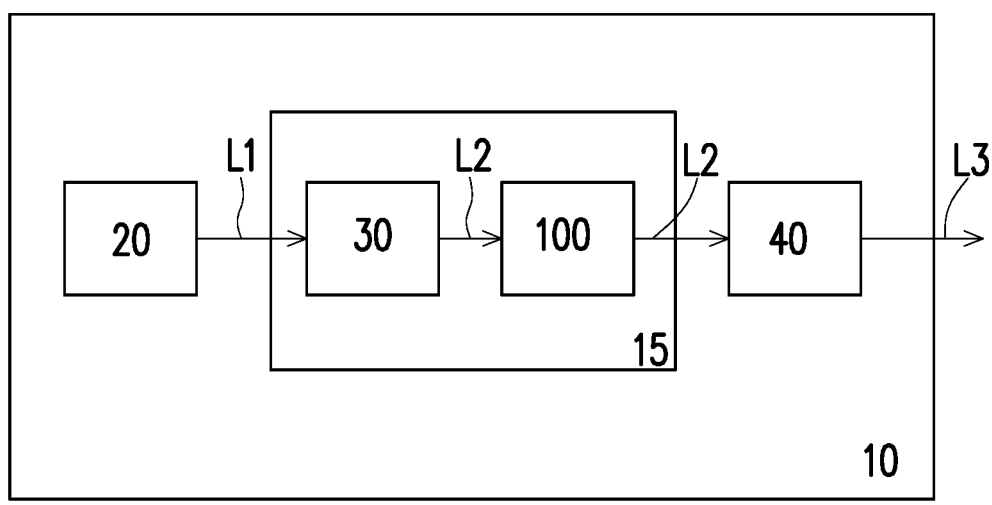
FIG. 1 is a schematic view of a projection device according to an embodiment of the disclosure.

FIG. 1 is a schematic view of a projection device according to an embodiment of the disclosure. Referring to FIG. 1, in this embodiment, a projection device 10 is adapted to provide a projection beam L3, e.g., a projector, but the disclosure is not limited thereto. The projection device 10 includes an illumination system 20, at least one light valve 30, a projection lens 40 and a transparent rotating device 100. Herein the combination of the light valve 30 and the transparent rotating device 100 may be part of the components of an optical engine module 15 of the projection device 10. However, the disclosure is not limited thereto. The illumination system 20 is adapted to provide an illumination beam L1 to an image display surface 32 of the light valve 30 to produce an image beam L2. The image beam L2 is transmitted from the light valve 30 to the transparent rotating device 100 to be transmitted to the projection lens 40. Finally, the projection lens 40 converts the image beam L2 into the projection beam L3, and projects the projection beam L3 out of the projection device 10 to a projection target, e.g., a screen or a wall.

In this embodiment, the illumination system 20 is, for example, a combination of a light source and a plurality of optical components adapted to sequentially or continuously provide light beams of different wavelengths to form the illumination beam L1. Regarding the method by which the illumination system 20 provides the illumination beam L1, the detailed steps and implementations thereof can be understood sufficiently from the teaching, suggestion and illustration of the common knowledge of this field. Thus, details thereof are not repeated hereinafter.

The light valve 30 is, for example, a reflective optical modulator such as a liquid crystal on silicon panel (LCoS panel) or a digital micro-mirror device (DMD). In some embodiments, the light valve 30 may also be a transmissive optical modulator such as a transparent liquid crystal panel, an electro-optical modulator, a maganeto-optic modulator, or an acousto-optic modulator (AOM). The disclosure does not impose any limitation on the type and kind of the light valve 30. Regarding the method by which the light valve 30 converts the illumination beam L1 from the illumination system 20 into the image beam L2, the detailed steps and implementations thereof can be understood sufficiently from the teaching, suggestion and illustration of the common knowledge of this field. Thus, details thereof are not repeated hereinafter. A single light valve 30 (such as an optical engine module 15 using 1-DMD) is used for illustration in this embodiment. However, in other embodiments, the number of the light valve 30 in the optical engine module 15 may be multiple. The disclosure is not limited thereto.

The projection lens 40 is, for example, a combination including one or more optical lenses having a refractive power, such as various combinations of non-planar lenses including a biconcave lens, a biconvex lens, a concave-convex lens, a convex-concave lens, a plane-convex lens, a plane-concave lens and so on. In one embodiment, the projection lens 40 may also include a planar optical lens, and converts the image beam L2 from the light valve 30 into the projection beam L3 by means of reflection or transmission and projects the projection beam L3 to the projection target. The disclosure does not impose any limitation on the type and kind of the projection lens 40. In this embodiment, the projection lens 40 has an incident end 42 (as shown in FIG. 2) and is disposed on the transmission path of the image beam L2.

Figure 2:
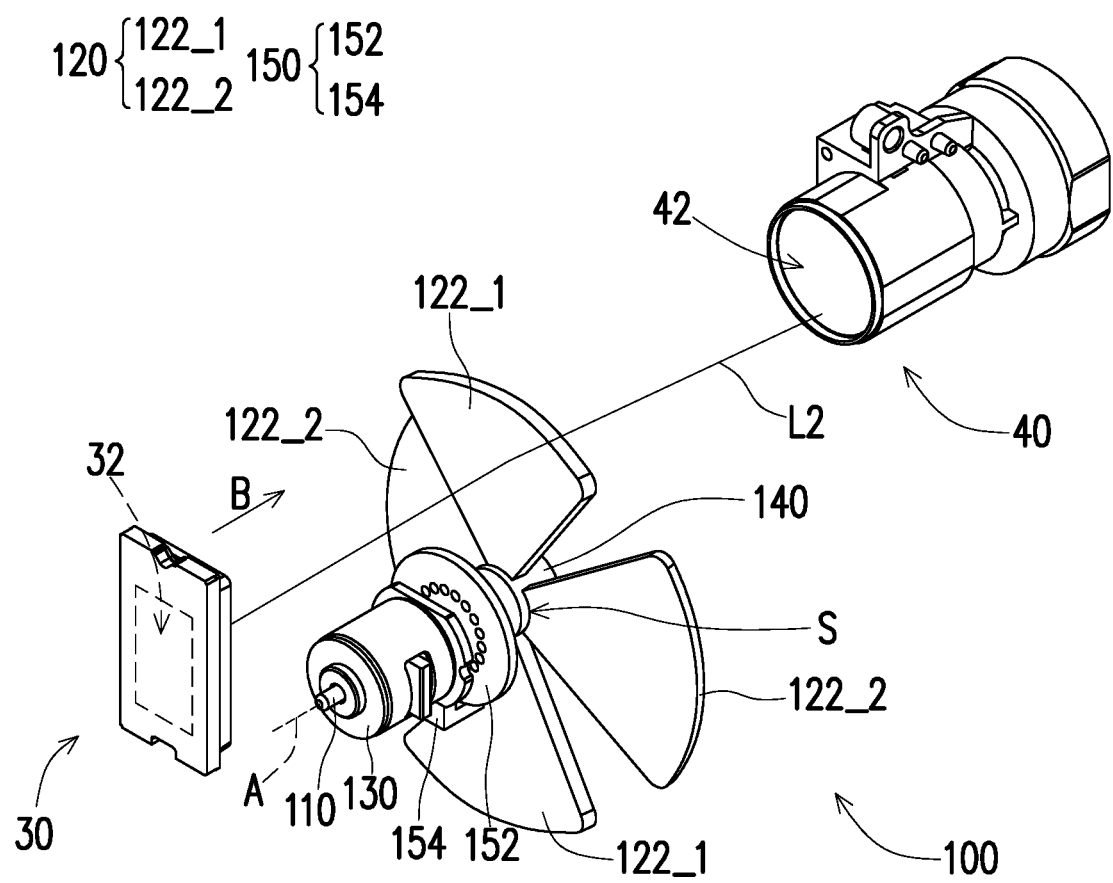
FIG. 2 is a schematic three-dimensional view of the light valve, the projection lens and the transparent rotating device of FIG. 1.

FIG. 2 is a schematic three-dimensional view of the light valve, the projection lens and the transparent rotating device of FIG. 1. Referring to FIG. 2, the transparent rotating device 100 is disposed on the transmission path of the image beam L2 from the light valve 30, thereby passing the image beam L2 through to be deflected and transmitted to the projection lens 40. In detail, the transparent rotating device 100 is located between the light valve 30 and the projection lens 40, and includes a shaft 110, a transparent rotating assembly 120 and a motor 130. The shaft 110 is connected to the motor 130 and may be driven by the motor 130 to be rotated. The transparent rotating assembly 120 is disposed on the transmission path of the image beam L2 and is connected to the shaft 110, and may be driven by the shaft 110 to be rotated around the shaft 110 that serves as the central axis. In other words, the shaft 110 is inserted through a through-hole or a bore of the transparent rotating assembly 120 to serve as the axis of the transparent rotating assembly 120. In this embodiment, an extending direction A of the shaft 110 is parallel to a transmitting direction B of the image beam L2. However, in some embodiments, an included angle may also be formed between the two directions. The disclosure is not limited thereto.

Specifically, the transparent rotating assembly 120 includes at least one first transparent sheet 122_1 and at least one second transparent sheet 122_2 that are annularly and alternatively arranged around the shaft 110. To facilitate explanation, this embodiment illustrates two first transparent sheets 122_1 and two second transparent sheets 122_2 as an example. That is, in this embodiment, the first transparent sheet 122_1 and the second transparent sheet 122_2 are the same in number and are each more than one. In other words, in this embodiment, one second transparent sheet 122_2 is disposed between two adjacent first transparent sheets 122_1, and one first transparent sheet 122_1 is disposed between two adjacent second transparent sheets 122_2. In some embodiments, the number of the first transparent sheet 122_1 and the number of the second transparent sheet 122_2 may each be one. The disclosure is not limited thereto. In addition, in this embodiment, the shape of the first transparent sheet 122_1 and the shape of the second transparent sheet 122_2 are sectors, and a first transparent sheet 122_1 and the second transparent sheet 122_2 are made of a glass material. In this embodiment, the whole piece of the first transparent sheet 122_1 and the whole piece of the second transparent sheet 122_2 are made of a transparent material, for example. In other embodiments, while the area where the image beam L2 is incident on the first transparent sheet and the second transparent sheet is a transparent area, the remaining part may be a non-transparent area. The disclosure is not limited thereto. Besides, the size of the first transparent sheet 122_1 and the size of the second transparent sheet 122_2 are greater than the size of the light valve 30. In detail, the area of the first transparent sheet 122_1 and the area of the second transparent sheet 122_2 are greater than the area of a reflecting surface of the light valve 30 for reflecting the image beam L2 (i.e., the area of the image display surface 32).

Figure 3A:
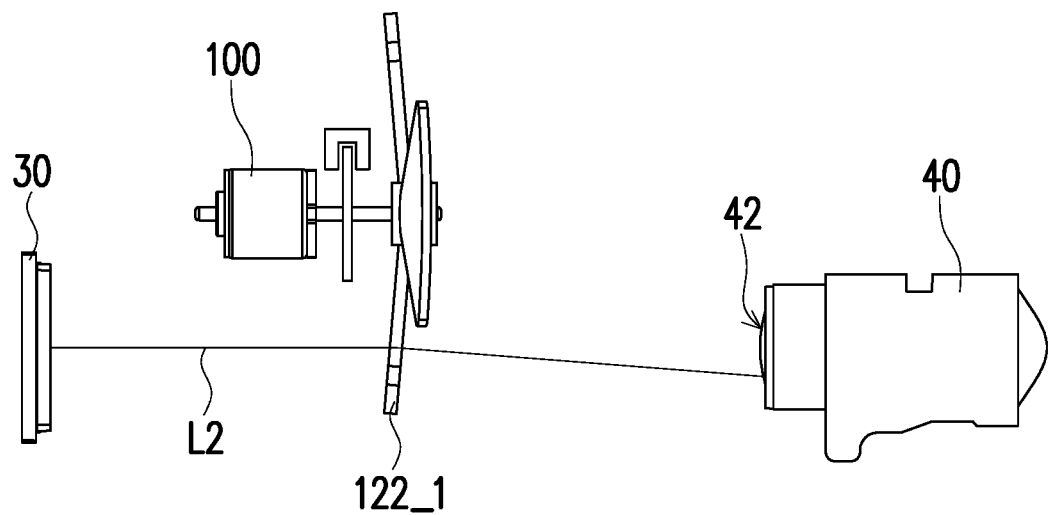
FIG. 3A and FIG. 3B are schematic views of the image beam of FIG. 2 incident on different positions on the projection lens respectively.
Figure 3B:
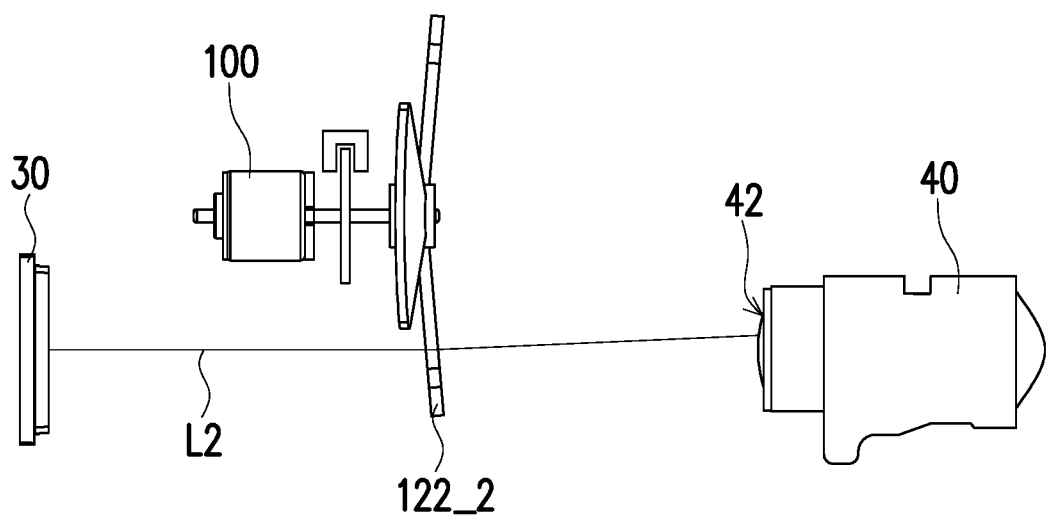

FIG. 3A and FIG. 3B are schematic views of the image beam of FIG. 2 incident on different positions on the projection lens respectively. Referring to FIG. 2 to FIG. 3B simultaneously, the angle at which the first transparent sheet 122_1 is inclined with respect to the shaft 110 is different from the angle at which the second transparent sheet 122_2 is inclined with respect to the shaft 110. In this embodiment, the first transparent sheet 122_1 inclines toward the light valve 30, and the second transparent sheet 122_2 inclines toward the projection lens 40. In other words, the direction at which the first transparent sheet 122_1 is inclined with respect to the shaft 110 is opposite to the direction at which the second transparent sheet 122_2 is inclined with respect to the shaft 110. Therefore, when the motor 130 drives the shaft 110, the first transparent sheet 122_1 and the second transparent sheet 122_2 of the transparent rotating assembly 120 are driven by the shaft 110 to be rotated around the shaft 110 that serves as the central axis, so that the first transparent sheet 122_1 and the second transparent sheet 122_2 sequentially enter the transmission path of the image beam L2. The image beam L2 is deflected to at least two different positions on the incident end 42 of the projection lens 40 respectively by the first transparent sheet 122_1 and the second transparent sheet 122_2 that are continuously rotated. That is to say, after passing through the first transparent sheet 122_1 and the second transparent sheet 122_2 each, the image beam L2 is deviated from the original transmission direction at which it is emitted from the light valve 30. In this embodiment, the image beam L2 from the light valve 30 passes through the first transparent sheet 122_1 to be deflected and transmitted to a first position on the incident end 42 of the projection lens 40, as shown in FIG. 3A. The image beam L2 from the light valve 30 passes through the second transparent sheet 122_2 to be deflected and transmitted to a second position on the incident end 42 of the projection lens 40, as shown in FIG. 3B.

In this way, by means of rotating the transparent rotating assembly 120, the position on the incident end 42 of the projection lens 40 to which the image beam L2 is transmitted may be changed at a high speed, so that the projection lens 40 provides projection images that are at different positions and are partially overlapping. Besides, when the position of the image beam L2 is changed at a high speed, a visual illusion is generated for human eyes due to the microscopic movement of the image, so that the user may attain an image with higher resolution. In this embodiment, the resolution of the image generated by the transparent rotating assembly 120 is doubled compared to the resolution of the conventional image.

In other embodiments, the direction at which the first transparent sheet 122_1 is inclined with respect to the shaft 110 may also be the same as the direction at which the second transparent sheet 122_2 is inclined with respect to the shaft 110. For example, the first transparent sheet 122_1 and the second transparent sheet 122_2 are both inclined toward the projection lens 40, and the angle at which the first transparent sheet 122_1 is inclined with respect to the shaft 110 is different from the angle at which the second transparent sheet 122_2 is inclined with respect to the shaft 110. Therefore, the shape of the transparent rotating assembly 120 is similar to a sector-like structure, but the disclosure is not limited thereto.

In this embodiment, the transparent rotating device 100 further includes an assembly piece 140 disposed on the shaft 110. The assembly piece 140 includes a plurality of installation slots S, and the first transparent sheet 122_1 and the second transparent sheet 122_2 are respectively fixed to the installation slots S. In other words, by the design of the installation slots S in the assembly piece 140, the inclined angles of the first transparent sheet 122_1 and the second transparent sheet 122_2 of the transparent rotating assembly 120 may be fixed in advance. In this way, the accuracy of the inclined angles of the transparent sheets 122_1 and 122_2 may be further improved, and the repair or maintenance of the transparent sheets 122_1 and 122_2 may be further facilitated.

Please continue to refer to FIG. 2. Besides, in this embodiment, the transparent rotating device 100 further includes a sensing module 150 disposed on the shaft 110. Specifically, in this embodiment, the sensing module 150 is a combination of a grating element 152 and a photoelectric sensor 154. The grating element 152 is disposed on the shaft 110, and the photoelectric sensor 154 is adapted to detect the light passing through the grating element 152. Therefore, when the motor 130 is activated, the grating element 152 is driven by the shaft 110 to be rotated synchronously with the transparent rotating assembly 120. In this way, the rotation angle and the rotation speed of the transparent rotating assembly 120 in a unit time may be detected by the photoelectric sensor 154, so that the frequency of the position change of the generated image and so on may be adjusted according to the feedback information of the sensing module 150. However, the disclosure is not limited thereto.

Figure 4:
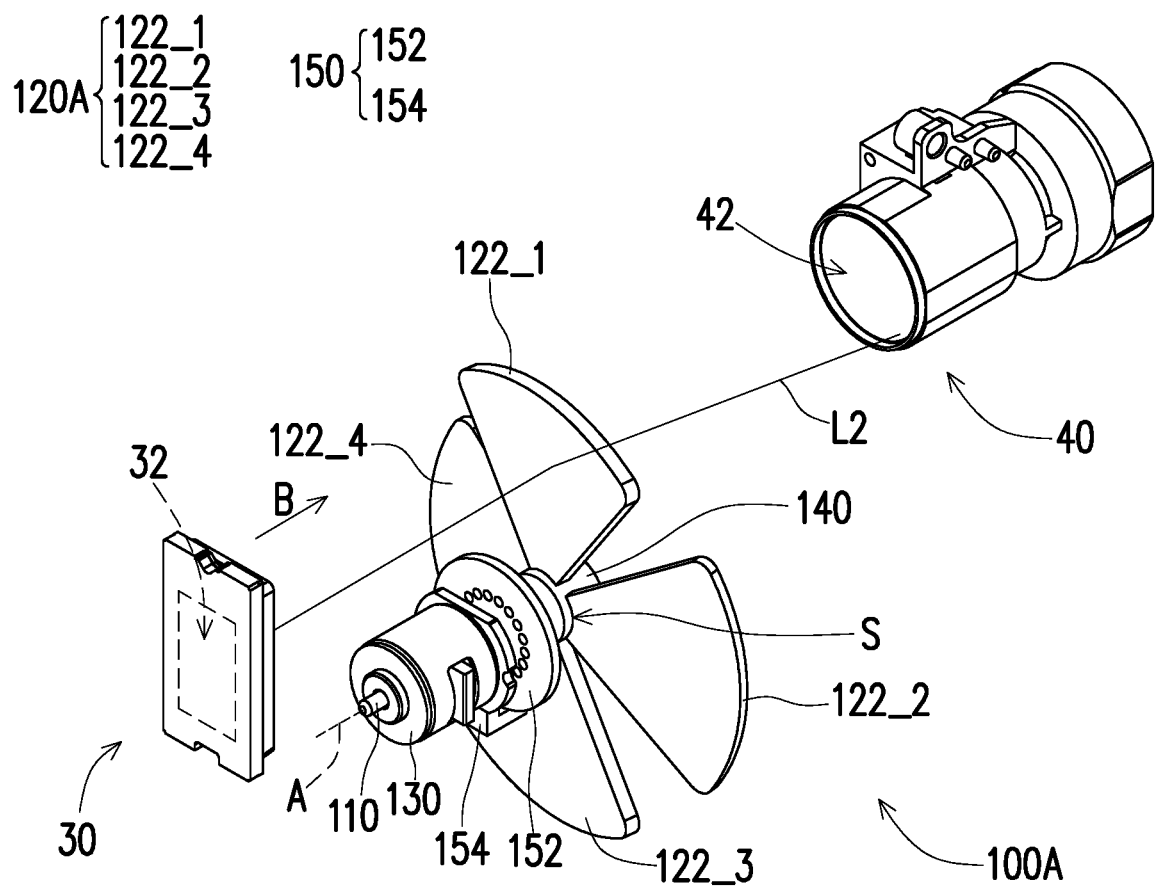
FIG. 4 is a schematic view of a light valve, a projection lens and a transparent rotating device according to another embodiment of the disclosure.

FIG. 4 is a schematic view of a light valve, a projection lens and a transparent rotating device according to another embodiment of the disclosure. Referring to FIG. 4, a transparent rotating device 100A in this embodiment is similar to the transparent rotating device 100 of FIG. 2. The difference between the two is as follows: in this embodiment, a transparent rotating assembly 120A of the transparent rotating device 100A further includes at least one third transparent sheet 122_3 and at least one fourth transparent sheet 122_4, and at least one first transparent sheet 122_1, at least one second transparent sheet 122_2, at least one third transparent sheet 122_3 and at least one fourth transparent sheet 122_4 are annularly and alternatively arranged around a shaft 110. To facilitate explanation, this embodiment illustrates only one first transparent sheet 122_1, one second transparent sheet 122_2, one third transparent sheet 122_3 and one fourth transparent sheet 122_4 as an example. In other words, in this embodiment, the first transparent sheet 122_1, the second transparent sheet 122_2, the third transparent sheet 122_3 and the fourth transparent sheet 122_4 are sequentially and annularly arranged in a ring shape.

Therefore, when the motor 130 drives the shaft 110, the transparent rotating assembly 120A is driven by the shaft 110 to be rotated, so that the first transparent sheet 122_1, the second transparent sheet 122_2, the third transparent sheet 122_3 and the fourth transparent sheet 122_4 sequentially enter the transmission path of an image beam L2. The image beam L2 from a light valve 30 passes through the third transparent sheet 122_3 to be deflected and transmitted to a third position on an incident end 42 of a projection lens 40, and the image beam L2 from the light valve 30 passes through the fourth transparent sheet 122_4 to be deflected and transmitted to a fourth position on the incident end 42 of the projection lens 40. In some embodiments, the first transparent sheet 122_1, the second transparent sheet 122_2, the third transparent sheet 122_3 and the fourth transparent sheet 122_4 may each be more than one in number as a group. The disclosure is not limited thereto.

The angle at which the first transparent sheet 122_1 is inclined with respect to the shaft 110 is different from the angle at which the second transparent sheet 122_2 is inclined with respect to the shaft 110. The angle at which the third transparent sheet 122_3 is inclined with respect to the shaft 110 is the same as the angle at which the first transparent sheet 122_1 is inclined with respect to the shaft 110. The angle at which the fourth transparent sheet 122_4 is inclined with respect to the shaft 110 is the same as the angle at which the second transparent sheet 122_2 is inclined with respect to the shaft 110. Besides, the first transparent sheet 122_1, the second transparent sheet 122_2, the third transparent sheet 122_3 and the fourth transparent sheet 122_4 are each disposed deflectively relative to a respective line of symmetry. Herein the deflection direction of the first transparent sheet 122_1 and the second transparent sheet 122_2 is opposite to the deflection direction of the third transparent sheet 122_3 and the fourth transparent sheet 122_4. In this embodiment, the line of symmetry may be a line connected from the shaft 110 to the midpoint on the curved outer edge of the sector transparent sheet. However, the disclosure is not limited thereto, and the line of symmetry may also be defined differently according to requirements.

Therefore, the first transparent sheet 122_1, the second transparent sheet 122_2, the third transparent sheet 122_3 and the fourth transparent sheet 122_4 may deflect the image beam L2 to four different positions on the incident end 132 respectively. In other words, since the deflection direction of the first transparent sheet 122_1 and the second transparent sheet 122_2 and the deflection direction of the third transparent sheet 122_3 and the fourth transparent sheet 122_4 are different from the deflection at which the first transparent sheet 122_1 and the second transparent sheet 122_2 are inclined with respect to the shaft 110 and the direction at which the third transparent sheet 122_3 and the fourth transparent sheet 122_4 are inclined with respect to the shaft 110, the deflection direction of the first transparent sheet 122_1 and the second transparent sheet 122_2 and the deflection direction of the third transparent sheet 122_3 and the fourth transparent sheet 122_4 may then determine the spacing between at least two different positions of the deflected image beam L2 in a single direction. However, the foregoing at least two different positions in a single direction are different from the at least two different positions (such as the first position and the second position as described above) resulting from the inclination of the transparent sheet with respect to the shaft 110. In this way, image resolution may be further improved. In this embodiment, the resolution of the generated image is four times higher than the resolution of the conventional image.

In conclusion, the embodiments of the disclosure achieve at least one of the following advantages or effects. In one embodiment of the disclosure, when the motor drives the shaft, the transparent rotating assembly is driven by the shaft to be rotated, and the image beam is deflected to at least two different positions on the incident end of the projection lens by the plurality of transparent sheets that are continuously rotated. Therefore, as the position of the image as projected by the projection lens is changed at a high speed, a visual illusion is generated for human eyes due to the microscopic movement of the image, so that the user may attain an image with higher resolution.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A transparent rotating device, comprising:
a shaft;
a transparent rotating assembly disposed on the transmission path of an image beam and connected to the shaft, wherein the transparent rotating assembly comprises at least one first transparent sheet and at least one second transparent sheet that are annularly and alternatively arranged around the shaft; and
a motor connected to the shaft and adapted for driving the shaft to rotate the transparent rotating assembly, wherein the at least one first transparent sheet and the at least one second transparent sheet sequentially enter the transmission path of the image beam, an angle at which the at least one first transparent sheet is inclined with respect to the shaft is different from an angle at which the at least one second transparent sheet is inclined with respect to the shaft, the image beam penetrates the at least one first transparent sheet to be deflected and transmitted to a first position, and the image beam penetrates the at least one second transparent sheet to be deflected and transmitted to a second position.

2. The transparent rotating device according to claim 1, wherein an extending direction of the shaft is parallel to a transmitting direction of the image beam.

3. The transparent rotating device according to claim 1, wherein the at least one first transparent sheet and the at least one second transparent sheet are the same in number and are each more than one.

4. The transparent rotating device according to claim 1, wherein a direction at which the at least one first transparent sheet is inclined with respect to the shaft is the same as a direction at which the at least one second transparent sheet is inclined with respect to the shaft.

5. The transparent rotating device according to claim 1, wherein a direction at which the at least one first transparent sheet is inclined with respect to the shaft is opposite to a direction at which the at least one second transparent sheet is inclined with respect to the shaft.

6. The transparent rotating device according to claim 1, wherein the transparent rotating assembly further comprises at least one third transparent sheet and at least one fourth transparent sheet, and the at least one first transparent sheet, the at least one second transparent sheet, the at least one third transparent sheet and the at least one fourth transparent sheet are annularly and alternatively arranged around the shaft; the at least one first transparent sheet, the at least one second transparent sheet, the at least one third transparent sheet and the at least one fourth transparent sheet sequentially enter the transmission path of the image beam; the image beam penetrates the at least one third transparent sheet to be deflected and transmitted to a third position, and the image beam penetrates the at least one fourth transparent sheet to be deflected and transmitted to a fourth position.

7. The transparent rotating device according to claim 6, wherein the angle at which the at least one third transparent sheet is inclined with respect to the shaft is the same as the angle at which the at least one first transparent sheet is inclined with respect to the shaft, and the angle at which the at least one fourth transparent sheet is inclined with respect to the shaft is the same as the angle at which the at least one second transparent sheet is inclined with respect to the shaft; the at least one first transparent sheet, the at least one second transparent sheet, the at least one third transparent sheet and the at least one fourth transparent sheet are each disposed deflectively relative to a respective line of symmetry, wherein a deflection direction of the at least one first transparent sheet and the at least one second transparent sheet is opposite to a deflection direction of the at least one third transparent sheet and the at least one fourth transparent sheet.

8. The transparent rotating device according to claim 1, wherein the at least one first transparent sheet and the at least one second transparent sheet are made of a glass material.

9. The transparent rotating device according to claim 1, wherein a shape of the at least one first transparent sheet and a shape of the at least one second transparent sheet are sectors.

10. The transparent rotating device according to claim 1, further comprising an assembly piece disposed on the shaft, wherein the assembly piece comprises a plurality of installation slots, and the at least one first transparent sheet and the at least one second transparent sheet are respectively fixed to the plurality of installation slots.

11. A projection device, comprising:
an illumination system adapted to provide an illumination beam;
at least one light valve disposed on the transmission path of the illumination beam for converting the illumination beam into an image beam;
a projection lens having an incident end and disposed on the transmission path of the image beam; and
a transparent rotating device comprising a shaft, a transparent rotating assembly and a motor, wherein
the transparent rotating assembly is disposed on the transmission path of the image beam and is connected to the shaft, and the transparent rotating assembly comprises at least one first transparent sheet and at least one second transparent sheet that are annularly and alternatively arranged around the shaft; and
the motor is connected to the shaft and is adapted for driving the shaft to rotate the transparent rotating assembly, wherein the at least one first transparent sheet and the at least one second transparent sheet sequentially enter the transmission path of the image beam, an angle at which the at least one first transparent sheet is inclined with respect to the shaft is different from an angle at which the at least one second transparent sheet is inclined with respect to the shaft, the image beam penetrates the at least one first transparent sheet to be deflected and transmitted to a first position on the incident end, and the image beam penetrates the at least one second transparent sheet to be deflected and transmitted to a second position on the incident end.

12. The projection device according to claim 11, wherein an extending direction of the shaft is parallel to a transmitting direction of the image beam.

13. The projection device according to claim 11, wherein the at least one first transparent sheet and the at least one second transparent sheet are the same in number and are each more than one.

14. The projection device according to claim 11, wherein a direction at which the at least one first transparent sheet is inclined with respect to the shaft is the same as a direction at which the at least one second transparent sheet is inclined with respect to the shaft.

15. The projection device according to claim 11, wherein a direction at which the at least one first transparent sheet is inclined with respect to the shaft is opposite to a direction at which the at least one second transparent sheet is inclined with respect to the shaft.

16. The projection device according to claim 11, wherein the transparent rotating assembly further comprises at least one third transparent sheet and at least one fourth transparent sheet, and the at least one first transparent sheet, the at least one second transparent sheet, the at least one third transparent sheet and the at least one fourth transparent sheet are annularly and alternatively arranged around the shaft; the at least one first transparent sheet, the at least one second transparent sheet, the at least one third transparent sheet and the at least one fourth transparent sheet sequentially enter the transmission path of the image beam; the image beam penetrates the at least one third transparent sheet to be deflected and transmitted to a third position, and the image beam penetrates the at least one fourth transparent sheet to be deflected and transmitted to a fourth position.

17. The projection device according to claim 16, wherein the angle at which the at least one third transparent sheet is inclined with respect to the shaft is the same as the angle at which the at least one first transparent sheet is inclined with respect to the shaft, and the angle at which the at least one fourth transparent sheet is inclined with respect to the shaft is the same as the angle at which the at least one second transparent sheet is inclined with respect to the shaft; the at least one first transparent sheet, the at least one second transparent sheet, the at least one third transparent sheet and the at least one fourth transparent sheet are each disposed deflectively relative to a respective line of symmetry, wherein a deflection direction of the at least one first transparent sheet and the at least one second transparent sheet is opposite to a deflection direction of the at least one third transparent sheet and the at least one fourth transparent sheet.

18. The projection device according to claim 11, wherein the transparent rotating device further comprises an assembly piece disposed on the shaft, wherein the assembly piece comprises a plurality of installation slots, and the at least one first transparent sheet and the at least one second transparent sheet are respectively fixed to the plurality of installation slots.

19. The projection device according to claim 11, wherein the at least one first transparent sheet and the at least one second transparent sheet are made of a glass material.

20. The projection device according to claim 11, wherein a shape of the at least one first transparent sheet and a shape of the at least one second transparent sheet are sectors.

* * * * *